(12) United States Patent
Schneider et al.

(10) Patent No.: US 7,357,054 B2
(45) Date of Patent: Apr. 15, 2008

(54) HIGHLY DYNAMIC PROCESSING MACHINE FOR LENSES

(75) Inventors: Gunter Schneider, Marburg (DE); Helwig Buchenauer, Dautphetal-Buchenau (DE); Ulf Boerner, Marburg (DE); Klaus Kraemer, Dautphetal-Friedensdorf (DE)

(73) Assignee: Schneider GmbH & Co. KG, Steffenberg (DE)

( * ) Notice: Subject to any disclaimer, the term of this patent is extended or adjusted under 35 U.S.C. 154(b) by 99 days.

(21) Appl. No.: 11/249,798

(22) Filed: Oct. 13, 2005

(65) Prior Publication Data

US 2006/0081097 A1   Apr. 20, 2006

(30) Foreign Application Priority Data

Oct. 13, 2004   (DE) ...................... 10 2004 049 951

(51) Int. Cl.
  *B23B 5/24*   (2006.01)
(52) U.S. Cl. .......................................... 82/158; 82/157
(58) Field of Classification Search ................. 82/158, 82/18, 137, 157
  See application file for complete search history.

(56) References Cited

U.S. PATENT DOCUMENTS

| 1,514,352 | A | * | 11/1924 | Taylor et al. ................. 82/1.11 |
| 4,274,313 | A | * | 6/1981 | Vulic ............................ 82/12 |
| 4,800,548 | A | * | 1/1989 | Koishi et al. ............. 369/53.18 |
| 4,941,291 | A | * | 7/1990 | Brueck ........................ 451/384 |
| 4,995,300 | A | * | 2/1991 | Kaplan et al. ................. 82/12 |
| 5,022,294 | A | * | 6/1991 | Higuchi et al. ................. 82/18 |
| 5,163,009 | A | * | 11/1992 | Yamane ....................... 700/169 |
| 5,344,261 | A | * | 9/1994 | Cliber ........................ 409/132 |
| 5,684,610 | A | * | 11/1997 | Brandestini et al. ........ 358/498 |
| 5,842,395 | A | * | 12/1998 | Hall .............................. 82/12 |
| 7,104,169 | B2 | * | 9/2006 | Inada et al. .................... 82/149 |
| 7,168,351 | B2 | * | 1/2007 | Hirayama et al. ........... 82/1.11 |
| 2003/0183050 | A1 | * | 10/2003 | Savoie et al. ................ 82/11.3 |
| 2004/0119984 | A1 | * | 6/2004 | Andreev et al. ............. 356/495 |
| 2004/0134318 | A1 | * | 7/2004 | Inada et al. .................... 82/149 |
| 2005/0005744 | A1 | * | 1/2005 | Hirayama et al. ........... 82/1.11 |
| 2006/0248697 | A1 | * | 11/2006 | Schaefer ..................... 29/27 C |

FOREIGN PATENT DOCUMENTS

| DE | 8513146 | 4/1988 |
| DE | 260 847 A3 | 12/1988 |
| DE | 689 14 256 T2 | 7/1994 |
| DE | 196 53 233 | 7/1998 |

(Continued)

OTHER PUBLICATIONS

European Search Report for European No. EP 1 647 36, dated Mar. 15, 2006.

*Primary Examiner*—Willmon Fridie, Jr.
(74) *Attorney, Agent, or Firm*—Darby & Darby

(57) ABSTRACT

A highly dynamic lens processing machine with a machine bed having at least a first tool holder and one workpiece holder with an axis of rotation and including a workpiece spindle arranged thereon. The first tool holder includes at least one dynamic linear drive with a first oscillation axis which runs parallel to the axis of rotation. The workpiece holder includes at least one dynamic linear drive in the direction of a second oscillation axis which is arranged parallel to the first oscillation axis.

23 Claims, 6 Drawing Sheets

FOREIGN PATENT DOCUMENTS

| | | |
|---|---|---|
| DE | 10126039 | 12/2002 |
| EP | 0 370 788 B1 | 3/1994 |
| EP | 1413938 | 4/2004 |
| EP | 1495839 | 1/2005 |
| JP | 04-283070 | 10/1992 |
| JP | 2000-296449 | 10/2000 |
| WO | WO 97/13603 | 4/1997 |

\* cited by examiner

C-C

HIGHLY DYNAMIC PROCESSING MACHINE FOR LENSES

The invention relates to a highly dynamic lens processing machine with a machine bed, on which at least a first tool holder and one workpiece holder with an axis of rotation R1 and comprising a workpiece spindle are arranged, the first tool holder comprising at least one dynamic linear drive with a first oscillation axis O1 which runs parallel to the axis of rotation R1, together with a linear drive, said linear drive comprising a housing with a runner for the tool holder and/or the workpiece holder, which runs on bearings and which can be moved in a linear direction.

BACKGROUND

An arrangement is already known from DD 260 847 A3 designed to provide smooth, linear elastic support which offers lateral stability and is torsion-proof. The arrangement comprises pre-formed leaf springs which are slit and which are firmly fixed at the ends of the resulting spring tongues into the interlocking spring mechanism of the components. Here, the different pre-formed leaf springs lie parallel to each other, the arrangement having a symmetrical form. The fixing points of the pre-formed leaf springs concerned lie at a level which is parallel to the direction of spring movement, the total width of the spring tongues, which are each fixed within the movable components, being the same for a pre-formed leaf spring and at the same distance from the fixing point. Due to the angle position of the leaf springs concerned during bending, a traverse movement of the actuator is generated which runs at right-angles to the direction of movement.

WO 97/13603 according to the FIG. 1, together with the related description in the penultimate paragraph on page 9, describes a processing machine for manufacturing optical surfaces and formed shells according to individual data specifications in a single processing stage. Here, a tool holder which oscillates in the Z direction is fitted, which is in turn assigned a workpiece holder with a spindle on a slide which can be moved in the Z axis. Here, the slide is brought into a position for preadjustment, and is then clamped firmly in place for the duration of the processing. A dynamic drive according to the invention, which is moved during the processing sequence, is not described in this publication.

An object of the present invention is to form and arrange a lens processing machine and the related linear drive so as to enable simple, low-cost processing of the workpiece.

The present invention provides a highly dynamic lens processing machine that includes a workpiece holder having at least one dynamic linear drive in the direction of a second oscillation axis O2 which is arranged in parallel to the first oscillation axis O1. Furthermore, a runner is guided over a leaf spring bearing arrangement formed from leaf springs in the housing in a coaxial direction to the oscillation axis O1, the leaf spring bearing arrangement being formed in two parts, and comprising a guidance arrangement and a coupling arrangement attached to said guidance arrangement. Here, the linear drive can take the form of a linear motor, or equally a slide-spindle pair. The drive can be regarded as being dynamic when the processing or milling sequence is actively supported or influenced. Here, an incremental, constant or step-by-step trigger is provided.

This enables the oscillation axis O1, O2 required for processing the workpiece or lens to be partially arranged in the tool holder, and in addition to this, partially in the workpiece holder. As a result, in particular the required strokes of the oscillation axis O1, O2 concerned can be used for processing on the one hand, as well as the required processing or oscillation frequencies, the oscillation of an axis or a combination of the oscillations of both axes. In this regard, it is also advantageous that the relationship of the oscillation stroke of the tool holder to the oscillation stroke of the workpiece holder lies between 0.08 and 1, in particular 0.13. When manufacturing a lens, the lens surface, which requires highly dynamic triggering for the cutting chisel, can be guaranteed due to the highly dynamic first oscillation axis O1 of the leaf spring bearing arrangement. The milling processing of the edge is conducted using the dynamic second oscillation axis O2, which comprises a significantly larger stroke than the first oscillation axis O1.

As a result, a simple and, in this respect, maintenance-free linear drive for the tool holder and/or the workpiece holder is guaranteed. Due to the use of a leaf spring bearing arrangement, the use of expensive slide and/or rolling bearings is not required. The stroke of the oscillation axis concerned, which is reduced in this respect due to the use of the leaf spring bearing arrangement can be compensated by overlaying or combining the aforementioned double oscillation arrangement. As well as the oscillation frequency of between 25 and 100 Hz, an oscillation path of between 1 and 20 mm is preferably provided in order to process the optical surface of a lens blank.

For this purpose, it is also advantageous that a second tool holder which is arranged in a stationary position is provided, towards which the workpiece can be moved via the second oscillation axis O2. As well as the overlay or combination of the two oscillation axes, the oscillation axis O2 which is assigned to the workpiece holder can also be used in order to process the workpiece. In this case, an oscillation of the tool holder is not necessary, so that said tool holder is arranged in a stationary position, for example in the form of a milling cutter, and the workpiece conducts the oscillation. When a rotating chisel is used for processing the plastic lens blanks, the first oscillation axis O1, i.e. the dynamic tool drive, is preferably used in order to process the optical surface, the second oscillation axis O2 of the workpiece holder being used to process the edge or to process the phases, and for the basic roughing-down work. Here, the use of a milling cutter is specified as an alternative to the rotating chisel.

Furthermore, it is advantageous that the leaf spring bearing arrangement comprises a coupling arrangement and a guidance arrangement, the coupling arrangement and/or the guidance arrangement being indirectly or directly connected with the runner and/or with the housing. The use of a coupling and guidance arrangement in each case, which in this respect forms a structural unit, guarantees the necessary rigidity of the bearing arrangement on the one hand, and the optimisation of the vibration behaviour of the overall arrangement on the other, in particular taking into account the frequencies of between 25 and 100 Hz to be specified here.

It is also advantageous that the guidance arrangement is formed from a first guide segment and a second guide segment, which is arranged at a distance in the direction of the oscillation axis O1. This guarantees double, front bearing support for the runner.

For this purpose, it is advantageous that the guide segment concerned comprises at least one bar-formed or plate-formed reinforcement element, and that the reinforcement element concerned is preferably carbon fibre-strengthened, or is formed of carbon fibre, the reinforcement element concerned being adhered to an adapter element which is preferably welded to the guide segment. Due to the use of reinforcement elements, the elastic part of the guide element concerned is reduced on its end sections and in the central section, i.e. the section where the runner or housing attachment is located. Here, the elastic length is approximately reduced to between 5 mm and 15 mm. Its structure made of, or using, carbon fibre guarantees the best possible weight ratio. Using the adapter element, the adhesive attachment next to the support surface can also cover the edge areas or front face sides of the adapter element.

Here, it is specified in an advantageous manner that the runner in the direction of the oscillation axis O1 comprises a front face side and a rear face side, the guide segment concerned being affixed to the runner in the area of the face side in order to form a first and a second runner bearing. The use of two guide segments results in the runner being retained on both sides on its two face sides. Due to the face side arrangement of the guide segments on the runner, the interim area which is thus created can be used to attach further runner bearing parts.

Of particular significance to the present invention is the fact that the external end sections of the guide segments in the radial direction to the oscillation axis O2 are connected to the coupling arrangement. The connection between the guide segments to the coupling arrangement guarantees the necessary coupling or restraint, and thus the required discontinuation of the vibration behaviour of the two guide segments. The external ends of each of the guide segments concerned act here as an optimum attachment point in order to attach the coupling arrangement.

In relation to the structure and arrangement according to the invention, it is advantageous that the coupling arrangement is formed from a first coupling segment and a second coupling segment, which are arranged opposite to each other in relation to the oscillation axis O1. This enables the external ends of the guide segments to be connected, which are also aligned in a radial direction to the oscillation axis, and which are also arranged opposite in relation to the oscillation axis.

Furthermore, it is advantageous that at least one end of the first guide segment and at least one end of the second guide segment are connected via at least one coupling segment. This mechanical coupling of the guide segments via the coupling segment concerned guarantees an optimum vibration behaviour on the guide segments, in particular taking into account the different natural frequencies of said guide segments. The natural frequencies are influenced by the coupling and guidance arrangement, and are thus moved into a frequency range outside that of the processing frequency.

Here it is advantageous that the connection between the guide segment and the coupling segment takes the form of a plug connection. The guide segment concerned comprises several recesses at each end, into which the corresponding pins of the coupling segment can be inserted. A weld connection can also be provided in addition to this plug connection.

It is also advantageous that the guide segment has a rhomboidal form or an oval double form, and that it is affixed to the housing via a housing bearing. Due to this basic form, the attachment to the runner or runner bearing is also guaranteed at the height of the runner, as well as the attachment point on the housing, i.e. the housing bearing, whereby starting from this central connection located in the area of the runner, the ends which extend outwards in a radial direction allow the continued attachment of the guide segment to the coupling segment concerned.

Furthermore, it is advantageous that a carrier element, which takes the form of a steering rod, is provided between the housing and the runner in a radial direction to the oscillation axis O1, whereby the steering rod is connected with the housing via a first joint and with the runner via a second joint. The steering rod therefore represents the core part of the leaf spring bearing arrangement, in particular taking into account the vibration behaviour of said bearing arrangement which occurs, and the necessary guidance of the movements which are created as a result. Here, the connection rod is triggered by oscillating movements of the runner, and thus completes a horizontal swing around the first joint on the side of the housing. Here, the joints are preferably formed using elastic spring joints, which do not comprise any slackness, and which have an adequate degree of rigidity alongside their degree of freedom.

Here, it is advantageous that at least one coupling segment is connected with the steering rod via a third joint. The attachment of the coupling segment to the steering rod guarantees an oscillation movement of the coupling segment which depends on the horizontal swing movement of the steering rod, which in turn is transferred to the relevant ends of the guide segments to which it is connected. Here, the third joint is also formed as an elastic flexible joint, so that the coupling segment is subjected to the minimum bending stress when the steering rod is swinging.

Finally, it is advantageous that the joint is formed as a rolling bearing or as an elastic flector. The formation of the joint as an elastic flector or spring joint guarantees the absolute zero flexibility of the attachment or connection of the individual segments, which, taking into account the desired processing frequency of between 25 and 100 Hz, and the masses to be moved, guarantees adequate rigidity on the one hand, and sufficiently low maintenance on the other, together with the ensuing necessary load level.

For this purpose, it is also advantageous that a distance A is provided in a radial direction to the oscillation axis O1 between the first joint and the second joint, and a distance B is provided between the first joint and the third joint, the ratio of A to B of the two distances being 2. An aspect ratio of 2 guarantees that the excursion of the coupling segment in the direction of the oscillation axis is exactly half the amount as the excursion of the runner itself. Any movement of the runner towards the oscillation axis, which brings with it a contradictory alteration in the opening angle concerned, $\alpha 1$, $\alpha 2$, of the rhomboid-formed guide segments, causes the ends of the guide segments to be moved towards the oscillation axis. This movement of the ends corresponds to the movement of the coupling segment which is arranged in the centre of the steering rod. The variation of this distance ratio should be specified here according to the structure of the guide segments.

Finally, it is advantageous that the second joint also guarantees a relative movement between the steering rod and the runner in a right-angled direction to the oscillation axis O1. Due to the tipping motion of the steering rod, the distance between the first and second bearing or bending point is altered, so that the necessary longitudinal compensation at right angles to the oscillation axis, or in the direction of the steering rod, is guaranteed by the second joint.

For this purpose, it is also advantageous that at least one coupling segment is connected with the third joint via a coupling member. The use of the coupling member makes it possible to vary the position of the coupling segment relative to the steering rod independently of the aforementioned attachment, while at the same time, taking into account said attachment.

The coupling element is thus arranged at a distance from the bearing point or swivelling axis of the third joint, whereby using the coupling member, the displacement path which is formed by the steering rod is guaranteed in accordance with the position of the third joint on the steering rod. Here, several coupling segments, in particular those which are arranged adjacent to a steering rod, can also be connected to the steering rod via a coupling member.

Furthermore, it is advantageous that the coupling segment and/or the coupling member has a U-form, L-form or triangular transverse profile. This structure ensures the necessary rigidity, taking into account bending and torsion stresses during operation.

Here, it is advantageous that the coupling segment comprises a connection point with the ends of the guide segments which takes the form of an elastic joint. The elastic joint has a flat structure, so that the relative excursion movement between the coupling segment and the guide segment concerned can be compensated. The aforementioned rigidity is therefore cancelled in the end sections.

It is also advantageous that the distance between the housing and the steering rod and/or the first joint can be adjusted using an adjusting device. Taking into account the required distance ratios between the firs and second bearing on the one hand, and the second and third bearing on the other, the adjustment device guarantees that the required distance ratio will be set, regardless of any given processing tolerances. The distance between the first bearing and the housing, or between the steering rod and the housing, can be created variably, so that the distance between the first and second bearing can be varied, depending on the distance produced between the second and third bearing.

It is also advantageous that the runner runs on bearings on the housing via the steering rod and the guide segment, the guide segment runs on bearings on the coupling segment, and the coupling segment runs on bearings on the housing via the steering rod. The frictional connection circuit thus created between the coupling and guidance arrangement on the one hand, and the housing and runner on the other, guarantees an optimum natural vibration frequency of the runner and an adequate displacement of the natural vibration frequency of the two arrangements in an area outside that of the processing frequency. When a cutting chisel is used as a tool and when plastic lenses are being processed, the cutting force to be applied to the chisel approximately totals between 50 and 200 Newton. Taking into account the processing frequency of between 25 and 100 Hz in relation to the oscillation frequency, and taking into account the masses of this linear drive required here, i.e. the runner, the tool holder and the motor actuator, it becomes clear, that the resulting vibration behaviour of the drive due to the required processing precision must be at an optimum level. Here, it is advantageous that the tool holder comprises a height adjustment feature, so that taking into account the alignment of the tool and the workpiece next to the processing axes, i.e. of the oscillation axis on the one hand, and a processing axis arranged radially to the workpiece on the other, the necessary adjustment to a spatial axis which is arranged at right angles to these two axes is guaranteed.

It is furthermore advantageous that at least one U-formed linear motor is assigned to the runner, which motor consists of the stator, which is formed from two magnetic tracks arranged in parallel, the magnetic tracks retaining the actuator between them. The motor coil of the actuator or the stator is air-core, poured in plastic and therefore very light. The forces of attraction of the opposite magnets are compensated by the U-arrangement of the stator, so that the guidance of the actuator over the runner or leaf spring bearing arrangement is guaranteed. The use of solely non-magnetic material prevents interference fields and disturbances from arising which can be traced back to the use of iron parts positioned at a distance. In addition, the motor, in particular the runner, becomes significantly lighter.

Finally, it is advantageous that the U-formed linear motor is aligned in relation to a level which is fixed by the actuator parallel to a level which is formed by the floor space used by the base plate. The application of force by the actuator on the runner is thus free of moments, since the distance between the point at which the force is applied and the centre of gravity of the runner is almost zero in the vertical direction.

BRIEF DESCRIPTION OF THE DRAWINGS

Further advantages and details of the invention are explained in the patent claims and in the description, and are represented in the Figures, in which:

DETAILED DESCRIPTION

Figure 1:
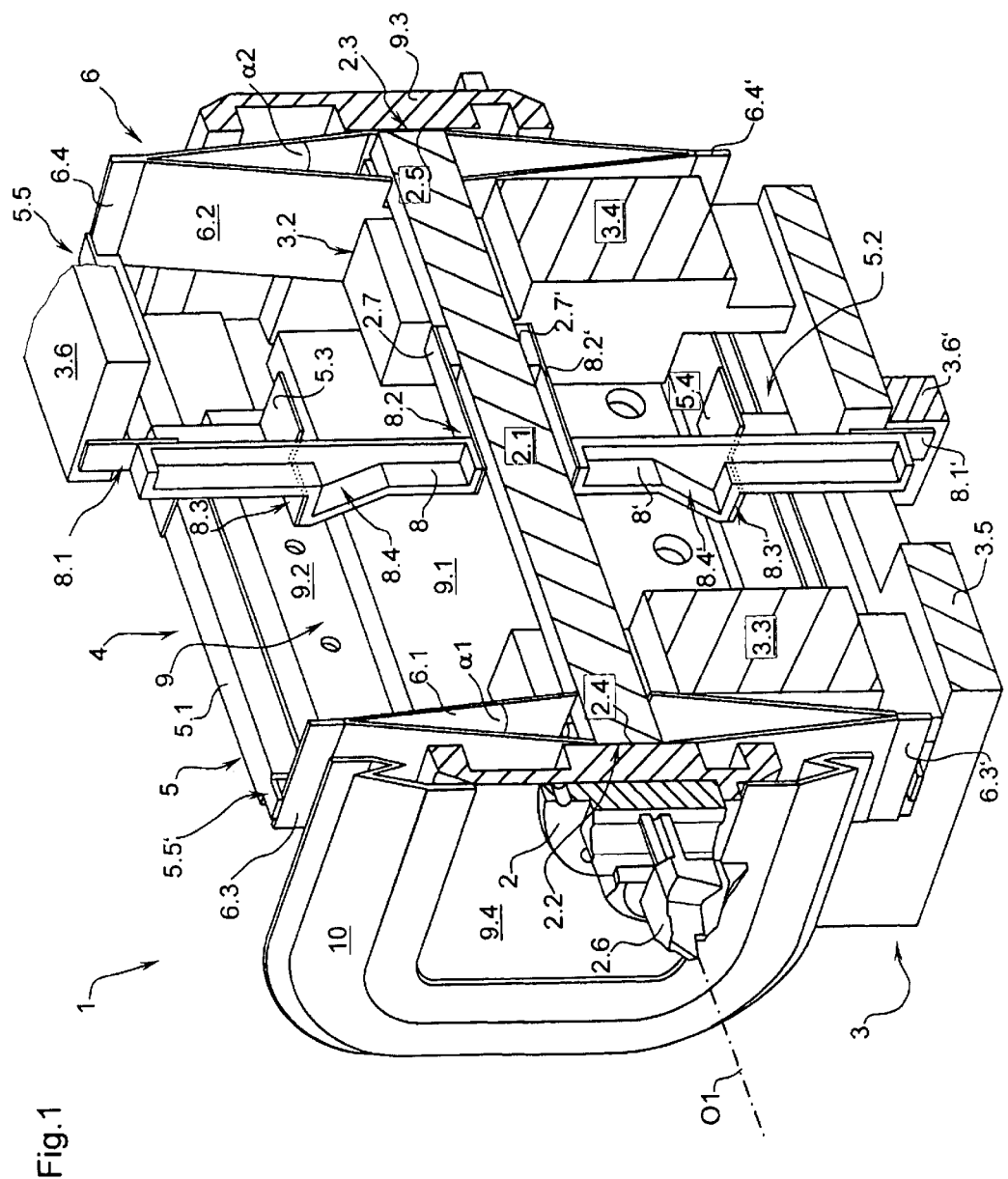
FIG. 1 shows an enlarged profile view of the linear drive

A linear drive 1, half of which is shown in FIG. 1, consists of a centrally arranged runner 2.1, which comprises on its front face side 2.2 a tool holder 2 for a rotating chisel 2.6. The runner 2.1 runs, vibrating, on bearings over a coupling arrangement 5 and a guidance arrangement 6 in the direction of an oscillation axis O1 within a housing. For this purpose, the housing 3 comprises a first housing section 3.3 and a second housing section 3.4, as well as a housing support 3.6 or 3.6', via which the coupling arrangement 5 and the guidance arrangement 6 are affixed to the housing 3 in such a manner that they can vibrate. The runner 2.1 is firmly connected to the guidance arrangement 6 on its front and rear face side 2.2, 2.3 via a first runner bearing 2.4 and a second runner bearing 2.5. Additionally, the runner 2.1 comprises a housing part 2.7, 2.7', via which it is flexibly connected to a carrier element 8 which takes the form of a steering rod, the steering rod 8 being flexibly connected to the housing support 3.6, 3.6'.

A linear motor 9, 9' is provided as a motor 9 for the linear drive 1 on both sides of the runner 2.1, which in each case comprises a U-formed stator 9.1, 9.1' and an actuator 9.2, 9.2' which is retained by said stator. Here, the actuator 9.2, 9.2' moves in a linear direction within the stator 9.1, 9.1', this linear movement being transferred via a first deflection part 9.3 and a second deflection part 9.4 in the area of the face sides 2.2, 2.3 onto the runner 2.1. The actuator 9.2, 9.2' runs on bearings indirectly over the bearing arrangement of the runner 2.1.

The guidance arrangement 6 comprises a first and a second guide segment 6.1, 6.2, which are in each case affixed on the face side on the runner 2.1 via the first and the second runner bearing 2.4, 2.5. Here, the guide segment 6.1, 6.2 concerned comprises a basic rhomboid form, which is determined on the one hand by the runner bearing 2.4, 2.5 concerned and the housing bearing 3.1, 3.2 concerned, while on the other, by the end sections or ends 6.4, 6.4' and 6.3, 6.3' which are positioned opposite in relation to the oscillation axis O1. The flow of the force runs initially from the runner 2.1 over the runner bearing 2.4, 2.5 concerned, onto the corresponding guide segment 6.1, 6.2. The guide segment 6.1, 6.2 is in turn connected centrally opposite the runner bearing 2.4, 2.5 concerned over the housing bearing 3.1, 3.2 concerned with the first or second housing section 3.3, 3.4. From this bearing arrangement, the runner 2.1, triggered by the motor 9 and the first or second deflection part 9.3, 9.4, could oscillate in the direction of the oscillation axis O1, whereby taking into account a deflection movement in the direction of the oscillation axis O1, reverse deformation movements of the guide segment 6.1, 6.2 concerned are created. With a deflection movement to the left according to FIG. 1, the first guide segment 6.1 would experience an expansion or extension of the opening angle α1, the second guide segment 6.2 experiencing a tapering or reduction of the opening angle α2. This contradictory angle alteration entails an alteration in the length or distance between the end sections or ends 6.4, 6.4' and 6.3, 6.3' concerned. In the aforementioned example, i.e. when the runner 2.1 is moved to the left in accordance with FIG. 1, and the angle α1 of the first guide segment 6.1 is enlarged, the distance of both ends 6.3, 6.3' is reduced. In return, the reduction of the angle α2 of the second guide segment 6.2 causes the distance of both ends 6.4, 6.4' to increase.

Here, the two guide segments 6.1, 6.2 are formed as two-dimensional leaf springs or as a two-dimensional leaf spring pair, which is connected to the end sections or ends 6.3, 6.4 concerned.

Here, the stator 9.1, 9.1' of the motor 9, 9' is firmly connected to the housing 3 or to a housing plate 3.5. Within the stator 9.1, the actuator 9.2 is flexibly arranged in a linear direction towards the oscillation axis 1. The runner 9.2 is coupled via the first and second deflection part 9.3, 9.4 with the first or second guide segment 6.1, 6.2, and flexibly runs on bearings over the aforementioned segments on the first and on the second housing section.

Figure 3:
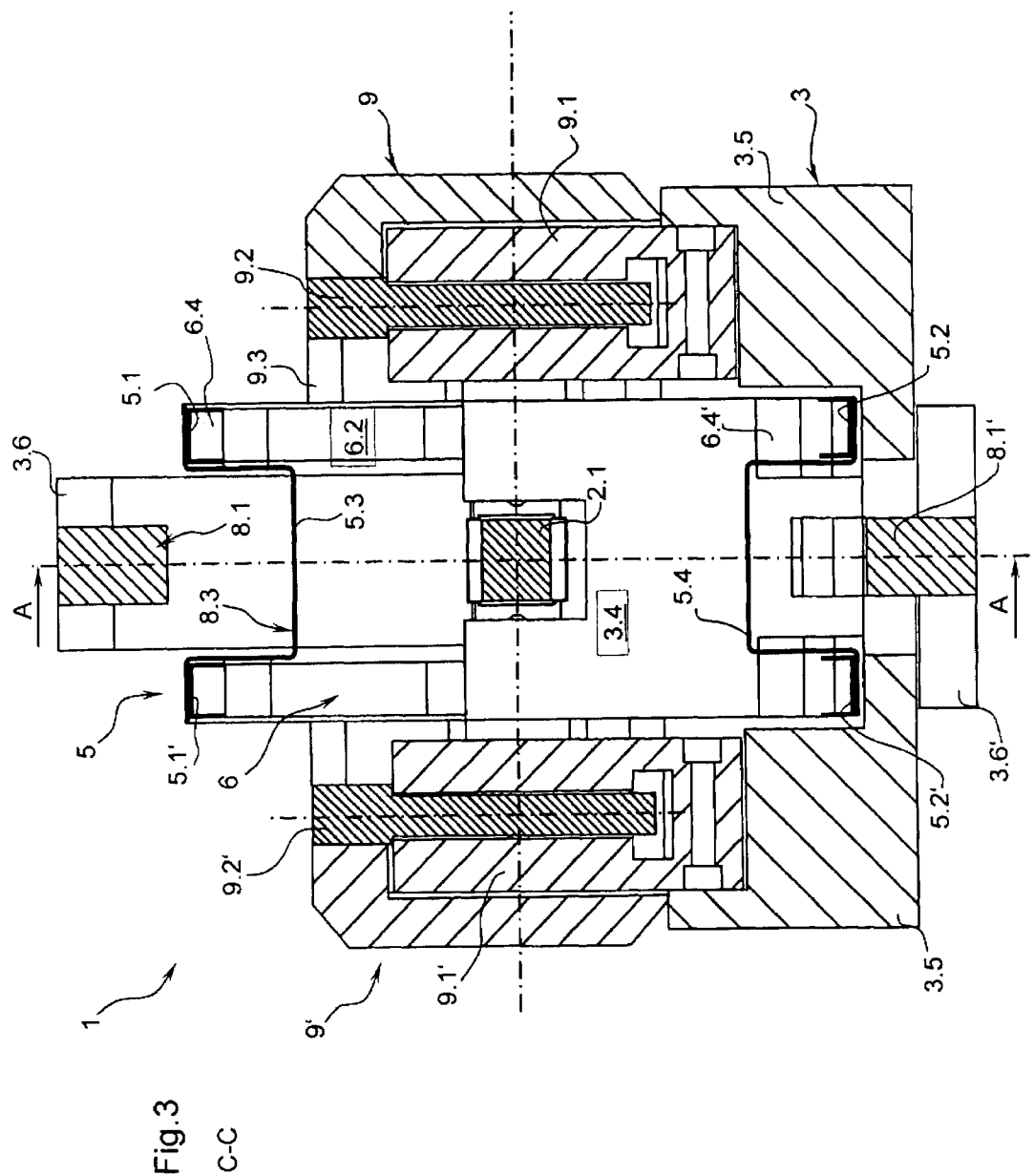
FIG. 3 shows a profile view from the front in accordance with section C-C from FIG. 2

In addition to the guide arrangement 6 with the two guide segments 6.1, 6.2, a coupling arrangement 5 is provided, which comprises a first coupling segment 5.1 and a second coupling segment 5.2, which connects the ends 6.3, 6.4 and 6.3' and 6.4' concerned of the two guide segments 6.1, 6.2. Due to the profile view, the adjacent coupling segments 5.1' and 5.2' are visible only in FIG. 3. The coupling segment 5.1', 5.2' concerned here takes the form of a U in profile, and comprises on the two face sides a nose-type connection point 5.5, 5.5' with the ends 6.3, 6.4 of the guide segments 6.1, 6.2, which takes the form of an elastic joint. The upper ends 6.3, 6.4 are here connected via two adjacent coupling segments 5.1, 5.1' which are shown in FIG. 3. A corresponding pair of coupling segments 5.2, 5.2' connects the two lower ends 6.3', 6.4' of the two guide segments 6.1, 6.2.

In order to stabilise the coupling segments 5.1, 5.2, they are connected to the steering rod 8 via a coupling member 5.3, 5.4 and a third joint 8.3 which is attached to it. The coupling member 5.3, 5.4 here takes the form of a double L or U-formed leaf spring part, which, starting from the attachment to the coupling segment 5.1, 5.2 concerned, guarantees the required attachment point to the steering rod 8 by compensating the height difference and by connecting both coupling elements 5.1, 5.2 with each other according to FIG. 3 at the height of the third joint 8.3. Here, the third joint 8.3 also takes the form of a leaf spring or elastic joint, so that when the steering rod 8 is swung out horizontally, a relative horizontal swing between the steering rod 8 and the coupling member 5.3, 5.4 is possible. The third joint 8.3 is here affixed on both sides of the steering rod 8 via a nose-type mould 8.4 on said steering rod.

For stabilisation purposes, and to guide coupling segments 5.1', 5.2', the steering rod 8, 8' is provided, which extends in a radial direction towards the oscillation axis O1 according to FIG. 1, and downwards. The steering rod 8 is here connected with the housing support 3.6 of the housing 3 via a first elastic lag joint 8.1 in such a way that it can be swung out. Here, the swinging movement runs in the direction of the oscillation axis O1, the first joint 8.1 acting as the swinging point or pivotal point of this swinging movement. Opposite the first joint 8.1, the steering rod 8 is connected with the runner 2.1 or with the holding part 2.7 of the runner 2.1 via a second elastic joint 8.2. The two joints 8.1, 8.2 here take the form of long leaf springs, the first joint 8.1 being shorter than the second joint 8.2. Taking into account the bending movement, the first joint 8.1 thus guarantees an otherwise rigid attachment of the steering rod 8 to the housing support 3.6. The second joint 8.2 is longer in form, so that a horizontal swing of the steering rod 8 relative to the runner 2.1 around the second joint 8.2 is possible on the one hand, while on the other, a longitudinal compensation in the direction of the steering rod 8 at right-angles to the oscillation axis O1 is guaranteed. Due to the excursion movement of the steering rod 8 around the first joint 8.1 caused by a displacement of the runner 2.1 in the direction of the oscillation axis 0 1 and the related angle position of the steering rod 8, a displacement of the second joint 8.2 in the direction of the steering rod 8 is required, since the distance between the first joint 8.1 and the runner 2.1 is increased, taking into account the relative position between the steering rod 8 and the runner 2.1. The steering rod 8 here takes the form of a box shape according to FIG. 6, providing a light, rigid construction. The nose-type mould 8.4 of the steering rod 8 in the area of its relevant side wall is used to support or affix the third joint 8.3 on both sides.

The distance between the first joint 8.1 and the second joint 8.2 is here double the size of the distance between the first joint 8.1 and the third joint 8.3, so that when the steering rod 8 is swung horizontally around the first joint 8.1, the displacement path in the direction of the oscillation axis O1 of the coupling member 5.3, 5.4 or the coupling segment 5.1, 5.2 is half the size of the displacement of the second joint 8.2 or the runner 2.1.

The runner 2.1 which is guided or which runs on bearings in this manner is sealed on its face side by a cover 10.

Figure 2:
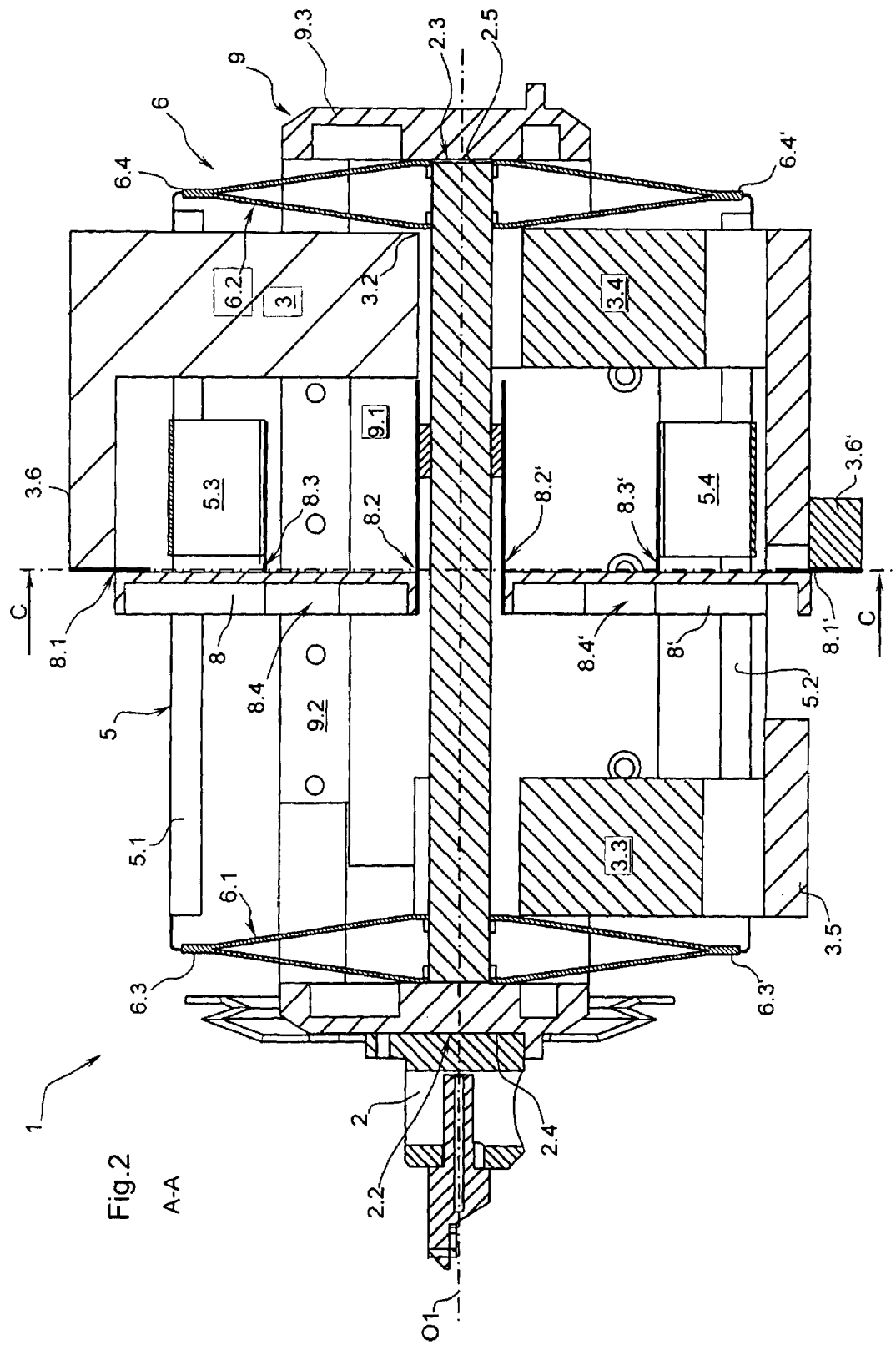
FIG. 2 shows a profile view from the side in accordance with section A-A from FIG. 3

In the side view according to FIG. 2, the attachment on the face side of the first and second deflection part 9.3, 9.4 to the runner 2.1 and the guide segments 6.1, 6.2 which are also affixed on the face side are clearly shown, together with their connection to the two housing parts 3.3, 3.4. The housing support 3.6 on which the first joint 8.1 for the steering rod 8 is arranged, is directly connected with the second housing part 3.4.

The two coupling members 5.3, 5.4 between the coupling segment 5.1, 5.2 and the steering rod 8, 8' comprise a right-angled, two-dimensional form, which offers the greatest possible torsion rigidity.

In the profile view from the front, the first joint 8.1 or the leaf springs which form the joint 8.1 are shown in profile, it being possible to see clearly the attachment to the housing support 3.6 which is located behind them. The housing support 3.6 extends downwards in the background to the second housing part 3.4. The second housing part 3.4 here comprises a right-angled recess in the area of the runner 2.1, and otherwise, with reference to this profile drawing, extends downwards over its entire area to the base plate 3.5. The coupling segments 5.1, 5.1', 5.2, 5.2' and the coupling members 5.3, 5.4 are here shown in profile. The guide segment 6.2 here extends with its upper end 6.4 behind the housing support 3.6 and behind the second housing part 3.4, downwards to the lower end 6.4', which is attached to the two coupling segments 5.2, 5.2'.

The corresponding first lower joint 8.1' is here also shown in profile, and is attached to the corresponding lower housing support 3.6'.

The two motors 9, 9' are positioned to the side of the aforementioned vibration arrangement. The two stators 9.1, 9.1' are here firmly connected to the housing plate 3.5 and have a U-formed cross section, each retaining the actuator 9.2, 9.2'. The actuator 9.2, 9.2' is here connected via the first deflection part 9.3 with the rear face side 2.3, not shown here, of the runner 2.1.

Figure 4:
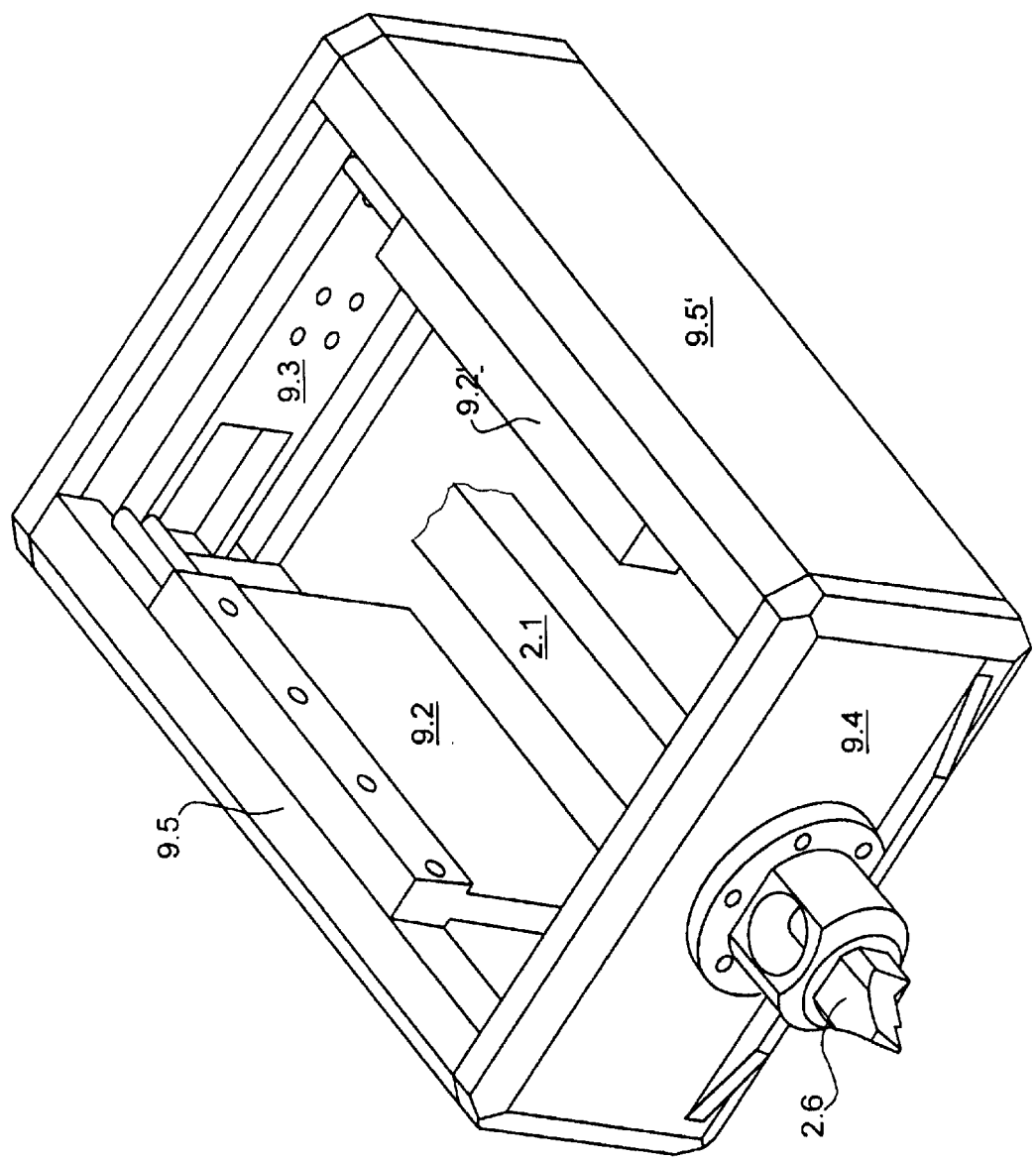
FIG. 4 shows an enlarged view of the moved parts

In FIG. 4, the moved parts of the linear drive 1 are shown. Together with the runner 2.1 and the rotating chisel 2.6, the first and second deflection part 9.3, 9.4 and the two actuators 9.2, 9.2' of the motor 9, 9' are shown. The two actuators 9.2, 9.2' are here firmly connected via adapter parts 9.5, 9.5' to the two deflection parts 9.3, 9.4.

Figure 5:
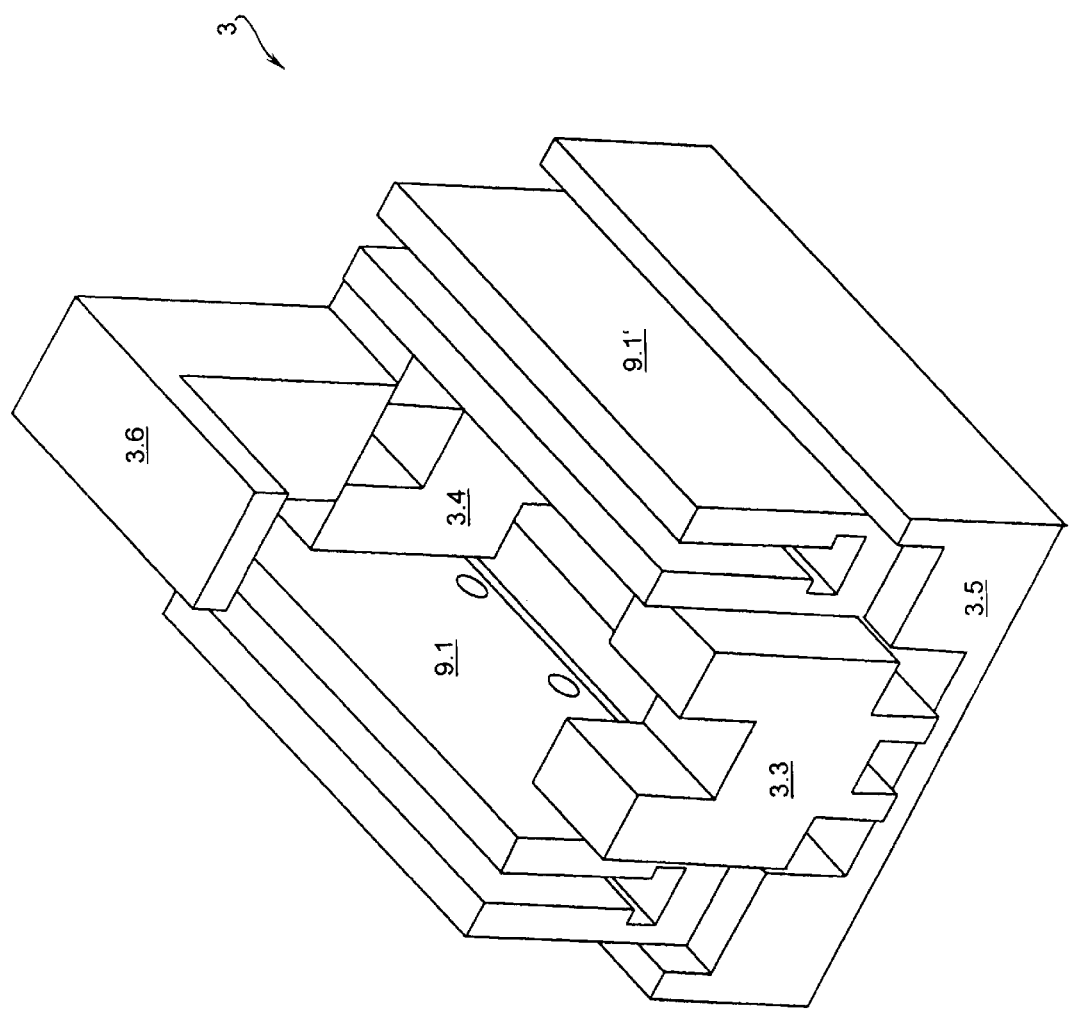
FIG. 5 shows an enlarged view of the standing housing sections

FIG. 5 shows the essential parts of the fixed housing, consisting of the base plate 3.5, the stators 9.1, 9.1' which are firmly arranged on the base plate as parts of the motor 9, 9' and the two housing parts 3.3, 3.4 to retain the guide segments not shown, and finally the housing support 3.6 to retain the upper first joint 8.1. The housing parts 3.4, 3.3 comprise the aforementioned right-angled recess in order to flexibly retain the runner, which is not shown.

The two stators 9.1, 9.1' which have a U-formed cross section comprise the corresponding flat, slit-shaped opening in order to retain the actuators, which are not shown.

Figure 6:
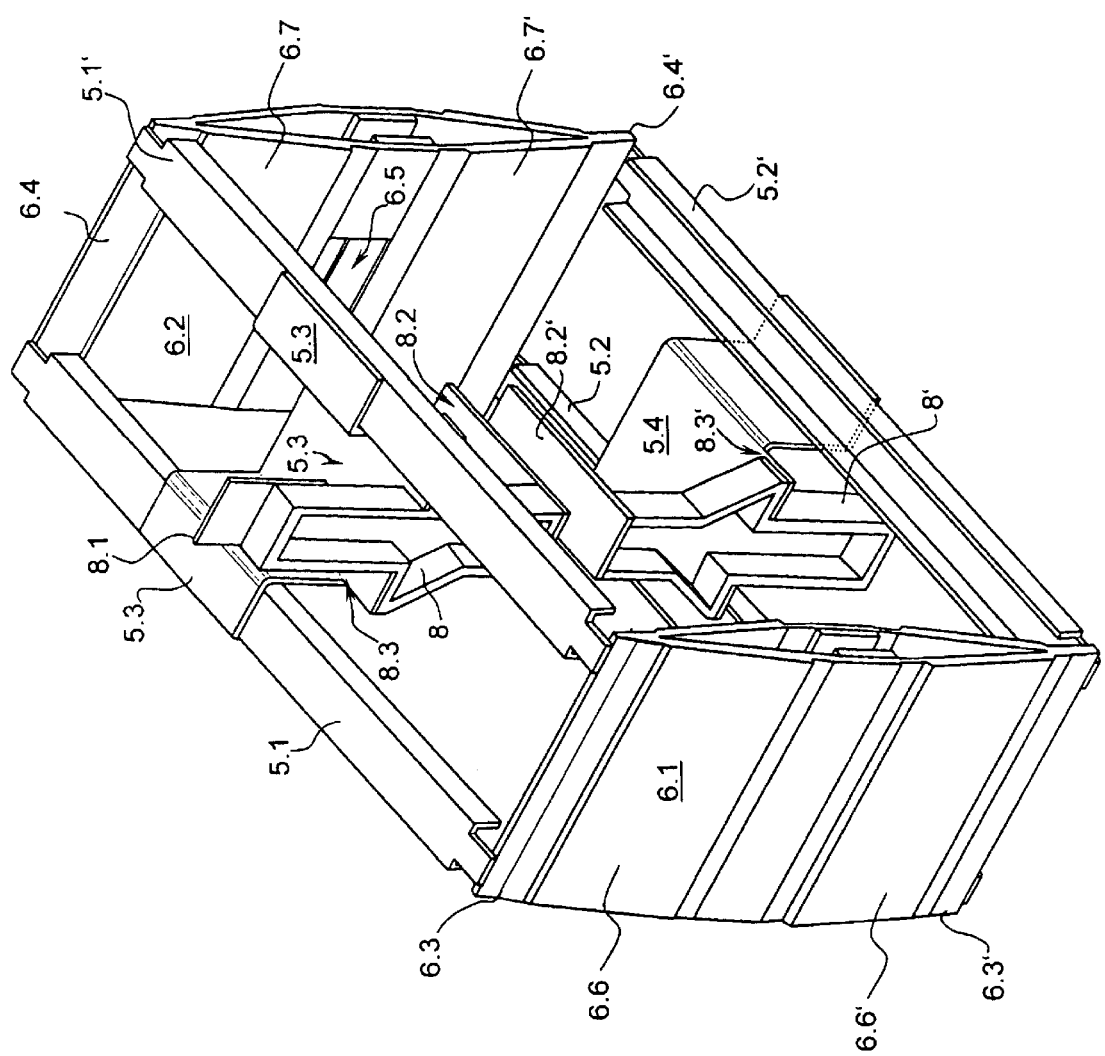
FIG. 6 shows an enlarged view of the overall bearing system

FIG. 6 shows the spring elements overall, i.e. the two double guide segments 6.1, 6.2 and the four coupling segments 5.1, 5.1' 5.2 and 5.2' which connect the two guide segments 6.1, 6.2 in the area of the ends 6.3. Next to these, the two steering rods 8, 8' are shown, together with the joints arranged on them, i.e. the first joint 8.1, the second joint 8.2 or 8.2' and the third joint 8.3 and 8.3', the latter being used as an attachment to the runner, which is not shown. The lower second joint 8.2' shown here is attached to the coupling member 5.4. The coresponding coupling member 5.3 is here also attached to the second bearing, which is not shown here. The upper coupling member 5.3 and the lower coupling member 5.4 take the form of a U-shaped cross section and encompass the coupling segments 5.1, 5.2 concerned on all sides at the connection point.

The second guide segment 6.2 comprises on its inner side a recess 6.5 to retain the runner, which is not shown here. A corresponding recess is also provided on the inner side of the first guide segment 6.1. The guide segment 6.1, 6.2 concerned is attached to the first and second housing part, not shown here, in the area of this recess 6.5.

The guide segment 6.1, 6.2 concerned is strengthened on both sides by at least one bar-formed or plate-formed reinforcement element 6.6, 6.6', 6.7, 6.7' in the area between the two ends 6.3, 6.3' or 6.4, 6.4'. The reinforcement element 6.6, 6.6', 6.7, 6.7' is here directly welded or adhered onto the guide segment 6.1, 6.2. In an exemplary embodiment not shown, the reinforcement element 6.6, 6.6', 6.7, 6.7' is adhered to an adapter element which has been welded onto the guide segment 6.1, 6.2. The adapter element here has a trough shape, so that the reinforcement element next to the support surface can also be adhered to the adapter element via at least one adjacent face side. The reinforcement element is preferably made of carbon fibre.

What is claimed is:

1. A linear drive for a lens processing machine defining a linear oscillation axis for a tool holder, the linear drive comprising:
    a housing;
    a plurality of leaf springs disposed in the housing and forming a leaf spring bearing arrangement including a guidance arrangement and a coupling arrangement attached to the guidance arrangement, wherein the guidance arrangement includes a first guide segment and a second guide segment disposed at a distance from the first guide segment in a direction of the oscillation axis; and
    a runner guided over the bearing arrangement, attached to at least one of the first and second guide segments and moveable in a linear direction coaxial with the oscillation axis, wherein the runner includes a front face side and a rear face side, at least one of the first and second guide segments being attached to the runner in the area of a respective one of the front and rear face side so as to form a first and a second runner bearing.

2. The linear drive as recited in claim 1, wherein at least one of the guidance arrangement and the coupling arrangement has a connection to at least one of the runner and the housing.

3. The linear drive as recited in claim 2, wherein the connection is an indirect connection.

4. The linear drive as recited in claim 1, wherein at least one of the first and second guide segments includes at least one reinforcement element formed as one of a bar and a plate.

5. The linear drive as recited in claim 4, wherein the at least one reinforcement element includes a carbon fibre.

6. The linear drive as recited in claim 4, further comprising an adapter element welded to the guide segment and wherein the at least one reinforcement element is attached to the adapter element.

7. The linear drive as recited in claim 1, wherein external end sections of at least one of the first and second guide segments in the radial direction to the oscillation axis are connected to the coupling arrangement.

8. The linear drive as recited in claim 1, wherein the coupling arrangement includes a first coupling segment and a second coupling segment arranged opposite to the first coupling segment relative to the oscillation axis.

9. The linear drive as recited in claim 1, wherein at least one end of the first guide segment and at least one end of the second guide segment are connected via at least one of the first and second coupling segment.

10. The linear drive as recited in claim 7, wherein the connection between the guide segment and the coupling segment is a plug connection.

11. The linear drive as recited in claim 4, wherein at least one of the first and second guide segments has one of a rhomboidal form and an oval form, and is affixed to the housing via a housing bearing.

12. The linear drive as recited in claim 8, farther comprising a first joint, a second joint and a steering rod disposed between the housing and the runner in a radial direction to the oscillation axis, and wherein the steering rod is connected with the housing via the first joint and with the runner via the second joint.

13. The linear drive as recited in claim 12, farther comprising a third joint and wherein at least one of the first and second coupling segments is connected to the steering rod via the third joint.

14. The linear drive as recited in claim 13, wherein at least one of the first, second, and third joints is formed includes one of a rolling bearing and an elastic flector.

15. The linear drive as recited in claim 13, wherein a first radial distance separates the first joint and the second joint, and a second radial distance separates the first joint and the third joint, wherein a ratio of the first radial distance to the second radial distance is 2.

16. The linear drive as recited in claim 13, wherein the second joint permits a relative movement between the steering rod and the runner in a direction perpendicular to the oscillation axis.

17. The linear drive as recited in claim 13, wherein at least one of the first and second coupling segments is connected with the third joint via a coupling member.

18. The linear drive as recited in claim 17, wherein at least one of the first and second coupling segments and the coupling member includes at least one of a U-form, an L-form, and a triangular transverse profile.

19. The linear drive as recited in claim 18, wherein at least one of the first and second coupling segments includes a connection point with the ends of the guide segments, the connection point having the form of an elastic joint.

20. The linear drive as recited in claim 12, further comprising an adjusting device configured to adjust a distance between the housing and one of the steering rod and the first joint.

21. The linear drive as recited in claim 1, wherein the runner runs on the beating arrangement via the steering rod, wherein the guide segment runs on coupling bearings on the coupling segment, and wherein the coupling segment runs on bearings on the housing via the steering rod.

22. The linear drive as recited in claim 1, further comprising at least one U-formed linear motor assigned to the runner, and having an actuator and a stator that includes two magnetic tracks arranged in parallel, the magnetic tracks retaining the actuator between them.

23. The linear drive as recited in claim 22, wherein the U-formed linear motor is aligned relative a first level fixed by the actuator and parallel to a second level formed by a floor space used by a base plate.

* * * * *